May 19, 1931.  C. J. FANCHER ET AL  1,806,195
GLAZIER'S POINT MACHINE
Filed Jan. 12, 1927   6 Sheets-Sheet 1

FIG.1

INVENTORS.
Charles J. Fancher,
Robert A. Johnson,
Frank A. Cutter,
BY
ATTORNEY.

May 19, 1931.  C. J. FANCHER ET AL  1,806,195
GLAZIER'S POINT MACHINE
Filed Jan. 12, 1927    6 Sheets-Sheet 3

Patented May 19, 1931

1,806,195

UNITED STATES PATENT OFFICE

CHARLES J. FANCHER, OF WINDSOR, VERMONT, AND ROBERT A. JOHNSON, OF LONG-MEADOW, MASSACHUSETTS, ASSIGNORS, BY MESNE ASSIGNMENTS, TO WOODARD, HUBBARD COMPANY, OF HILL, NEW HAMPSHIRE, A CORPORATION OF NEW HAMPSHIRE

GLAZIER'S-POINT MACHINE

Application filed January 12, 1927. Serial No. 160,639.

Our invention relates to improvements in machines for producing from narrow strips of metal diamond-shaped glaziers' points; and the objects of our invention are, first, to produce a machine for making glaziers' points of diamond shape in great quantities and at a minimum cost of production; second, to provide such a machine with means for producing either zinc or tempered steel glaziers' points by simply changing a portion of the feeding mechanism, or from one to the other of the two feed-mechanism attachments required respectively for zinc and steel; and, third, to provide the machine with means for cutting the strips into points by the mere operation of successively shearing the strips on one plane as they are fed to the cutters.

This machine is designed to handle and cut ten metallic strips into diamond-shaped glaziers' points, and to handle ten rows or trains of the points after being cut, at each cycle of operation of the machine. It is to be understood, however, that the number ten as applied to the machine might be increased or decreased without changing any essential feature of the machine or departing from the invention. Even a single strip might be fed into the machine and the single train of points therefrom pushed on to be acted on by mechanism not here involved, without making any mechanical change, or a machine might be built to handle the single strip and the single train, and it naturally follows that a machine might also be built to handle more than ten strips and ten trains. Nevertheless, it is believed that the ten-unit machine is the best for all practical purposes.

Other objects and advantages will appear in the course of the following description.

A preferred embodiment of the invention, whereby we attain the objects and secure the advantages of the same, is illustrated in the accompanying drawings, and we will proceed to describe the invention with reference to said drawings, although it is to be understood that the form, construction, arrangement, etc., of the parts in various aspects are not material and may be modified without departing from the spirit of the invention.

In the drawings, in which like reference characters designate like parts throughout the several views, Fig. 12, a back side elevation of the machine.

Since the strips are fed vertically to the cutters, and it is essential, after the first cut is made, to produce a plurality of glaziers' points at each active stroke of the said movable cutter, it is necessary that the cutter-head or cutting mechanism be set obliquely to the vertical plane of the strips where they are fed to the cutters. Inasmuch as it is preferred that each point be equal in width between either pair of its oppositely disposed edges to the width of the strip from which the point is cut, the cutter-head is set at an angle of 40° to the vertical plane of said strip, that being the degree angle of two parallel edges of said point when the latter is placed vertically on one of said edges. Due to this angular setting or position of the cutter-head, the same is shown, in the front side elevations of the machine and of said head as it is located in and as a part of said machine, inclined downwardly and forwardly from the back to the front side of the machine, as is actually the case.

A table 1 may be used on which to support the machine. A bed block 3 is mounted on and secured to the table 1.

A portion of the bed block 3 inclines at an angle of 40° downwardly from the rear to the front side of the machine to provide a bed 10 for the cutter-head. Bolted to two lugs 11 at the right-hand end of the bed 10 are two bearings 12 in which is journaled a shaft 13, the same being the main drive shaft for the cutter-head and other elements of the machine.

Mounted on and secured to the bed block 3 is a bracket 15, the rear end of said bracket being flush with the side of said block which is adjacent to the back side of the table 1. The base of the bracket 15 has at the front corner a vertical bearing 15′ for the lower end of a vertical shaft 16. Having their bases firmly seated in the bed block 3 are three posts 17, and these posts are rigidly connected at the top by means of a platform 18. The posts 17 are in triangular relationship to each other. Secured on top of the platform 18 is a plate 19 which has at one edge a vertical bearing 20 over the bearing 15′ for the upper terminal of the shaft 16, and on top two bearings 21 for a horizontal shaft 22 that extends transversely of the machine. Having its base bolted to the plate 19 is a stand 24 provided at the top with a bearing 24′. Mounted on and secured to the post 17 that is nearer to the front end of the machine is a horizontal bracket 26 which extends obliquely forward from said post. Secured to the three posts 17 at a lower level than that of the bracket 26 is a platform 27 on which is mounted a motor 28. Secured to the same post with and below the bracket 26 is a bracket 29 that extends towards the front side of the machine. Secured to the innermost post 17 below the platform 18 is a horizontal arm 30 that extends towards the front side of the machine, and secured to said post below the platform 27 is a bracket 31 which has the same general direction as said arm. Secured to the post 17 nearest the back side of the machine, below the platform 27, is a support 32 for a switch 260 by means of which the current to the motor 28 is turned on and off. Secured to the same post 17 that carries the support 32, but below said support, is a bracket 34 that extends towards the rear end of the machine, and has a bearing 35 for the forward terminal of a shaft 294 which drives elements not herein shown. Another rearwardly extending bracket 37 is secured to the same post 17 with the bracket 34 below the same. The bracket 37 is provided at its outer terminal with a bearing 38 for a vertical shaft 39.

Figures 9, 11:
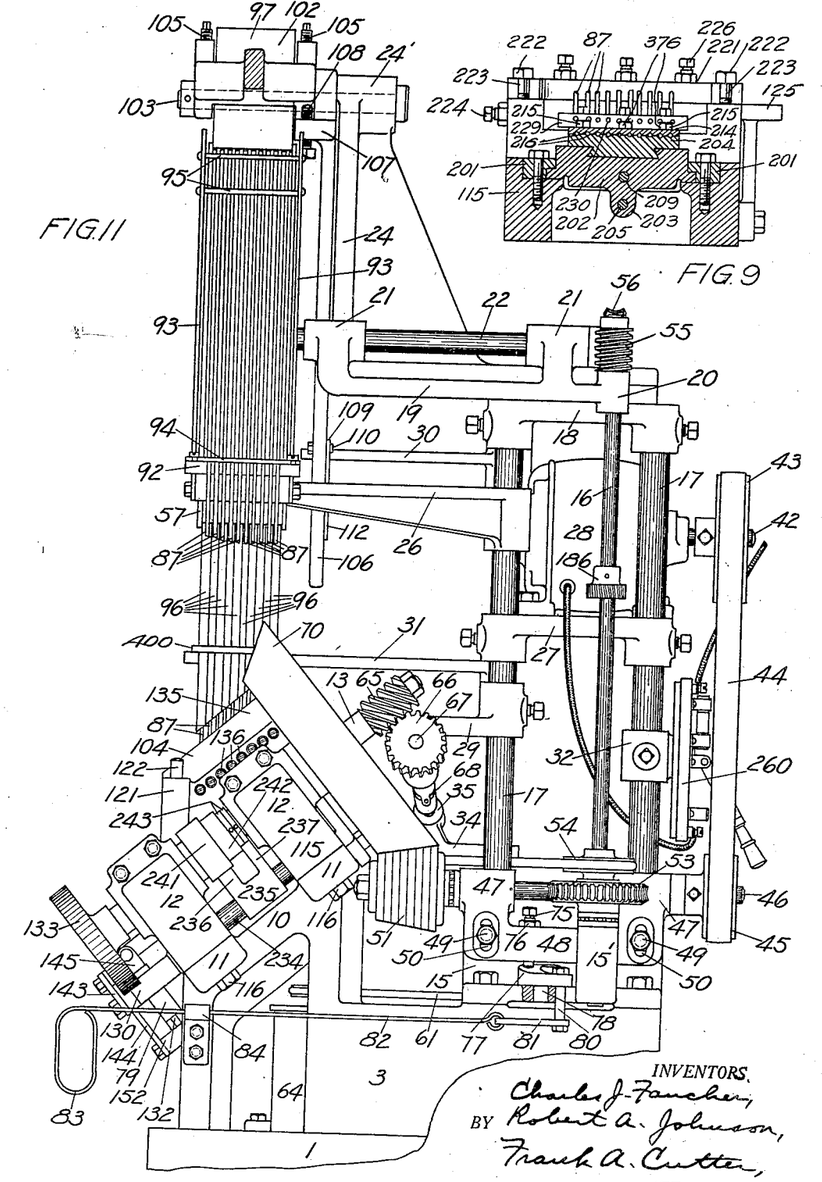
Fig. 9, a transverse, vertical section through said cutter-head, taken on lines 9—9, looking in the direction of the associated arrow, in Fig. 3.
Fig. 11, a front end elevation of the machine.
Figure 10:
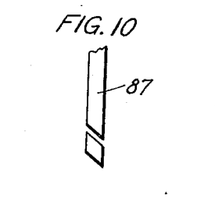
Fig. 10 is a plan view of a strip and a point cut therefrom showing how the point is formed by cutting the strip angularly.

Passing now to the driving mechanism, it will be observed that the motor 28 has a shaft 42 which extends outward on the back side of the machine, and that there is a pulley 43 mounted on and secured to said shaft. The pulley 43 is connected by means of a belt 44 with a smaller pulley 45 that is mounted on and secured to a horizontal shaft 46. The shaft 46 is journaled in two bearings 47 at the top of a movable carrier 48 held against the outer side of the upstanding part of the bracket 15 by means of two bolts 49 which pass through two vertical slots 50 in said carrier, said bolts being sufficiently loose to enable the carrier to be raised and lowered. The pulley 45 is at the rear end of the shaft 46, and mounted on and secured to said shaft at the forward end is a small friction cone 51. Also mounted on and secured to the shaft 46, between the bearings 47, is a worm 52. The worm 52 intermeshes with a worm-wheel 53 that is mounted on and secured to the shaft 16. Mounted on and secured to the shaft 16 above the worm-wheel 53 is a pulley 54, and mounted on and secured to said shaft, above the bearing 20, is a worm 55. The worm 55 intermeshes with a worm-wheel 56 mounted on and secured to the rear end of the shaft 22, outside of the rear bearing 21. A large wheel 57 is mounted on and secured to the shaft 22 in front of the front bearing 21. This wheel is a part of the feeding mechanism. Mounted on and secured to the upper terminal of the shaft 39, above the bearing 38, is a pulley 58 which is connected by means of a belt 59 with the pulley 54. Mounted on and secured to the shaft 39 below the bearing 38 is a pulley 60, and this pulley is connected by means of a belt 61 with a pulley 62 mounted on and secured to the upper terminal of a shaft 63 that drives a pump (not shown) in a tank 64 on the table 1. Mounted on and secured to the cutter-head shaft 13 is a worm 65, and intermeshing with said worm is a worm-wheel 66 mounted on and secured to a short shaft 67 at the outer end thereof, the inner end of said short shaft being connected by means of a universal-joint 68 with the forward terminal of the shaft 294. The bracket 29 has at the outer end a bearing 69 for the shaft 67—see Figs. 11 and 12. Mounted on and secured to the shaft 13, in front of the worm 65, is a large friction cone 70 which is driven by the friction cone 51 when in engagement with the large cone.

The carrier 48 has a vertical bolt 75 tapped into and through the horizontal part of the same, which bolt is provided with a check nut 76 above said horizontal part. The lower protruding end of the bolt 75 bears on a cam 77 which has a depending stem 78 that is journaled in the base of the bracket 14. The cam 77 has a tail-piece which extends outwardly at the front end of the machine, and is provided with a depending rod 80. Pivotally connected with the lower end of the rod 80 is a link 81, and pivotally connected with the end of said link which is nearer the front side of the machine is a horizontal operating rod 82 provided at its forward end with a handle 83. The rod 82 is supported and adapted to slide in a guide lug 84 secured below the lower lug 11 to the side of the bed block 3 from which said last-named lug projects.

The form of the cam 77 and the construction and arrangement of the operating members therefor are such that, when the rod 82 is drawn forwardly, said cam, through the medium of the link 81 and the rod 80, is partially rotated in the bearing for the stem 78 in a manner to permit the bolt 75 and the parts supported thereby to descend and thus remove the friction cone 51 from engagement with the friction cone 70 and disconnect the cutter-head shaft with all the parts and members driven and operated by said shaft; and, when said first-named rod is pushed rearwardly, said cam, through the same medium as before, is actuated in the opposite direction and raises said bolt and the aforesaid parts and members far enough to cause said first-named cone to engage said second-named cone, whereby said shaft and the parts and members driven and operated thereby are set in motion. The weight of the carrier 48 and the parts and members supported thereby is sufficient to cause the same to descend when the cam 77 is actuated by the rod 82 in being drawn forward. The slots 50 in the carrier 48 permit of the vertical movement of said carrier as just explained. This movement is comparatively slight, so that the worm 52 is not disengaged from the worm-wheel 53 during said movement, and the belt 44 is sufficiently loose to permit of said movement, but not so loose as to fail to drive the pulley 45 and the shaft 46 when the carrier 48 is in elevated position.

It will now be seen that the motor shaft 42 drives the shaft 46, through the medium of the pulleys 43 and 45 and the belt 44, that said second-named shaft drives the vertical shaft 16, through the medium of the worm 52 and the worm-wheel 53, and that said vertical shaft drives the horizontal shaft 22 and the feed wheel 57, through the medium of the worm 55 and the worm-wheel 56; and that, when the cone 51 is in engagement with the cone 70, the shaft 13 is driven and with it the worm 65, that said last-named worm drives the worm-wheel 66, the shaft 67, the universal-joint 68, and the shaft 294.

Ten strips, from which the points are cut, are represented at 87. These strips pass from a spool (not shown) to a guide which consists of a cross piece 92 having ten slots in the back side thereof, two side bars 93, a cross bar 94, and two cross rods 95. The cross piece 92 and the side bars 93 at their lower ends are bolted to the outer end of the bracket 26, the bar 94 is bolted to the top of said cross piece, and the rods 95 connect said side bars at and adjacent to their upper terminals. The side bars 93 extend upward and curve over the wheel 57, so that the rods 95 are located very close to the upper front quadrant of said wheel, in position to bear on the strips 87 as they pass over said wheel, or, in any event, to retain said strips on the wheel. The strips 87 pass upwardly through the slots in the cross piece 92 and behind the bar 94 onto the wheel 57, and between said wheel and the rods 95.

From the top of the wheel 57 the strips 87 pass rearwardly into ten guide tubes 96, being fed into said tubes by said wheel assisted by a leather-covered tension roll 97 which bears on said strips between the upper rod 95 and the entrance to said tubes. The tubes 96 at their upper and forward terminals are received in and supported by a holder 98 which is in close proximity to the bite between the wheel 57 and the roll 97. Two straps or links 400 one above the other, are provided to assist in holding or binding the tubes 96 together, and the lower link rests on the outer terminal portion of the bracket 31, which bracket extends to the left of said tubes.

The roll 97 has a shaft 99 which is journaled at each end in a bearing block 100 located in a slot 101 in each arm at the rear, bifurcated terminal of a lever 102. This bifurcated terminal has a pivotal connection at 103 with the bearing 24' at the top of the stand 24. The lever 102 extends from the bearing 24' towards the front end of the machine, and a weight 104 is adjustably mounted on the forward-terminal portion of said lever. The lever 102 is, therefore, by means of the roll 97, adapted to exert considerable pressure on the strips 87 where they pass over the wheel 57 and under said roll.

Inasmuch as it is desirable to vary the pressure at opposite ends of the roll 97 on the strips 87 beneath the same, the blocks 100 in the slots 101 are provided, and there is also provided for each of said blocks an adjusting screw 105 which is tapped down through the lever arm in which the block is located, to engage said block. By adjustment of the screws 105 the shaft 100 can be tilted, thereby tilting the roll 97 and causing said roll to bear harder at one end than at the other. The amount of adjustment here required is very slight. Without some adjustment of this kind there might be difficulty in feeding the ten strips uniformly or at the same rate of speed.

Provision is made for raising the roll 97 from the wheel 57 and maintaining said roll in elevated position, in order to facilitate the operation of starting into the machine strips 87 from a full spool of rolls 86, and for other purposes or reasons. To these ends are provided a lever 106 mounted at the upper end on the pivot 103, and having an arm 107 that extends beneath one of the arms at the bifurcated end of the lever 102, with an adjusting bolt 108 in said first-named arm to bear against the under side of said second-named arm, and a latch 109 pivotally connected at 110 with said first-named lever. The latch 109 extends towards the rear end of the machine and over the arm 30 (see Fig. 1), and has a notch 111 in the under side to engage the back side of said arm when the lever 106 is swung towards the front end of the machine to swing the lever 102 upwardly, through the medium of the arm 107 and the bolt 108. By adjusting the bolt 108 the amount of elevation given the lever 102 by means of the lever 106 can be changed. To release the lever 106 and permit the lever 102 to swing down again until the roll 97 bears on the wheel 57 or on the interposed strips 87, it is simply necessary to grasp a downwardly-extending part 112 of the latch 109 and rock the notched part at 111 of said latch upwardly out of engagement with the arm 30, at the same time grasping said first-named lever 106 and manipulating it to assist in releasing said latch and easing said roll down onto said wheel.

The ten tubes 96 are arranged side by side laterally of the machine, extend from the holder 98 towards the rear end of the machine, then curve downwardly and towards the front end of the machine, as represented at 96', and finally downward to within a short distance above the upper edges of plates 113 and 114 that form parts of the feeding attachment for zinc strips, or to within a short distance above the upper edges of plates 170 and 172 that form parts of the feeding attachment for steel strips.

The curved portions or bows, indicated at 96', in the tubes 96 enable the strips 87, when of steel, to crowd forward therein and thus be kept under tension, and this natural tension of said strips assists in the feeding operation, as will be more clearly understood when the feeding attachment for steel strips is described. The aforesaid curved portions are no hindrance to and may be an advantage in feeding the zinc strips with the aid of the feeding attachment therefor.

It is possible and practicable to operate the machine successfully without either of the special feeding attachments of which mention has been made, although better and more positive results are obtained by using one or the other of these attachments, accordingly as the machine be employed in producing zinc or steel points. If neither attachment is used, the strips pass from the lower ends of the tubes 96 to the cutting mechanism, as said strips are fed by the wheel 57 and the roll 97, and crowd forward in the tubular bows 96' wherein the natural resiliency of the strips, especially if they be of steel, materially assists in the proper presentation of the strips at the places where they are cut.

The zinc-strip feeding attachment is described below, attention being more particularly called to Figs. 13 to 17, inclusive.

Figures 2, 3, 4:
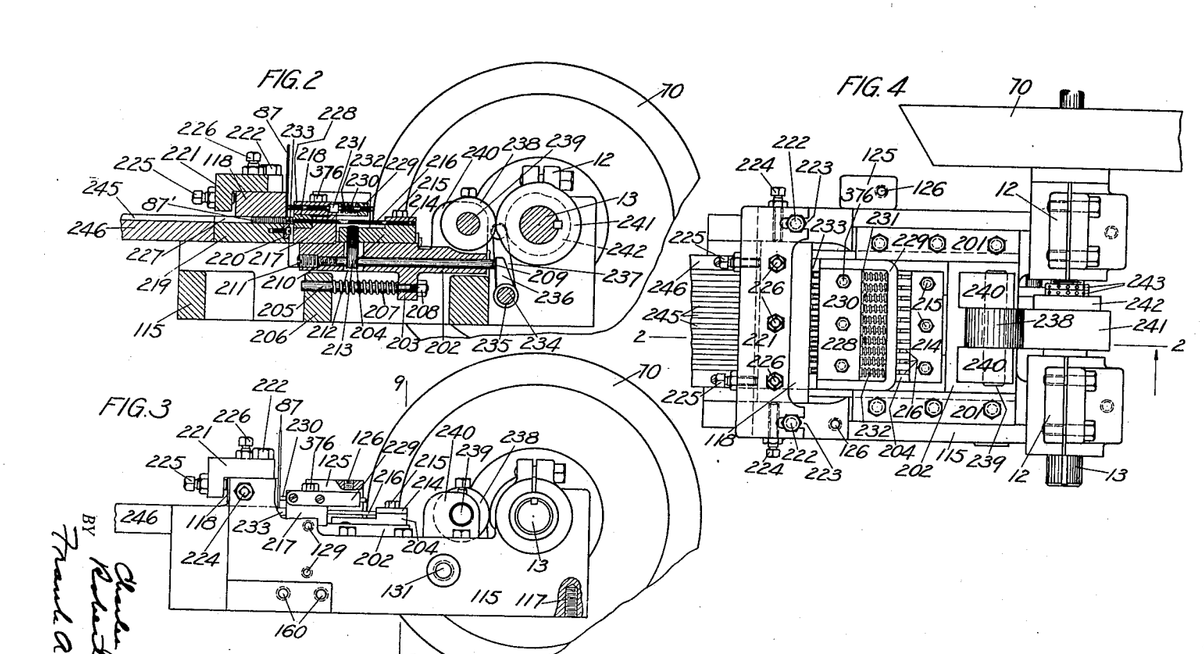
Fig. 2, a longitudinal, vertical section through the cutter-head of said machine, taken on lines 2—2, looking in the direction of the associated arrow, in Fig. 4.
Fig. 3, a front side elevation of said cutter-head.
Fig. 4, a top plan of said cutter-head; each of Figs. 5, 6, 7, and 8, a sectional detail illustrating a stage of the cutting operation.

The bearings 12 are parts of an inclined cutter-head bed 115 which is located on the inclined bed 10 and secured to the lugs 11 by means of bolts 116—116, one of the tapped openings for said bolts appearing at 117 in Fig. 3. The sides of the bed 115 are at right-angles to the top and bottom thereof. This bed carries cutting mechanism that includes a fixed knife 118, and the plates 113 and 114 of the zinc-strip feeding attachment reciprocate directly above said knife. There are ten vertical grooves 119 in the back side of the plate 114, and the strips 87, after they leave the bottom ends of the tubes 96, pass down in front of the plate 113 through said grooves and emerge directly in front of the knife 118, the front side of the plate 113 being in the same plane with the front side of said knife. The plate 114 has a base piece 120 which extends under the plate 113 and with the bottom edge of said first-named plate rests on the knife 118. The plate 113 is secured by means of screws or otherwise to the plate 114. On the front side of the plate 114 are two sleeves 121 which are adapted to slide on two guide rods 122. The sleeves 121 are parts of lugs 121'—121' which are directly secured to the plate 114.

Figure 1:
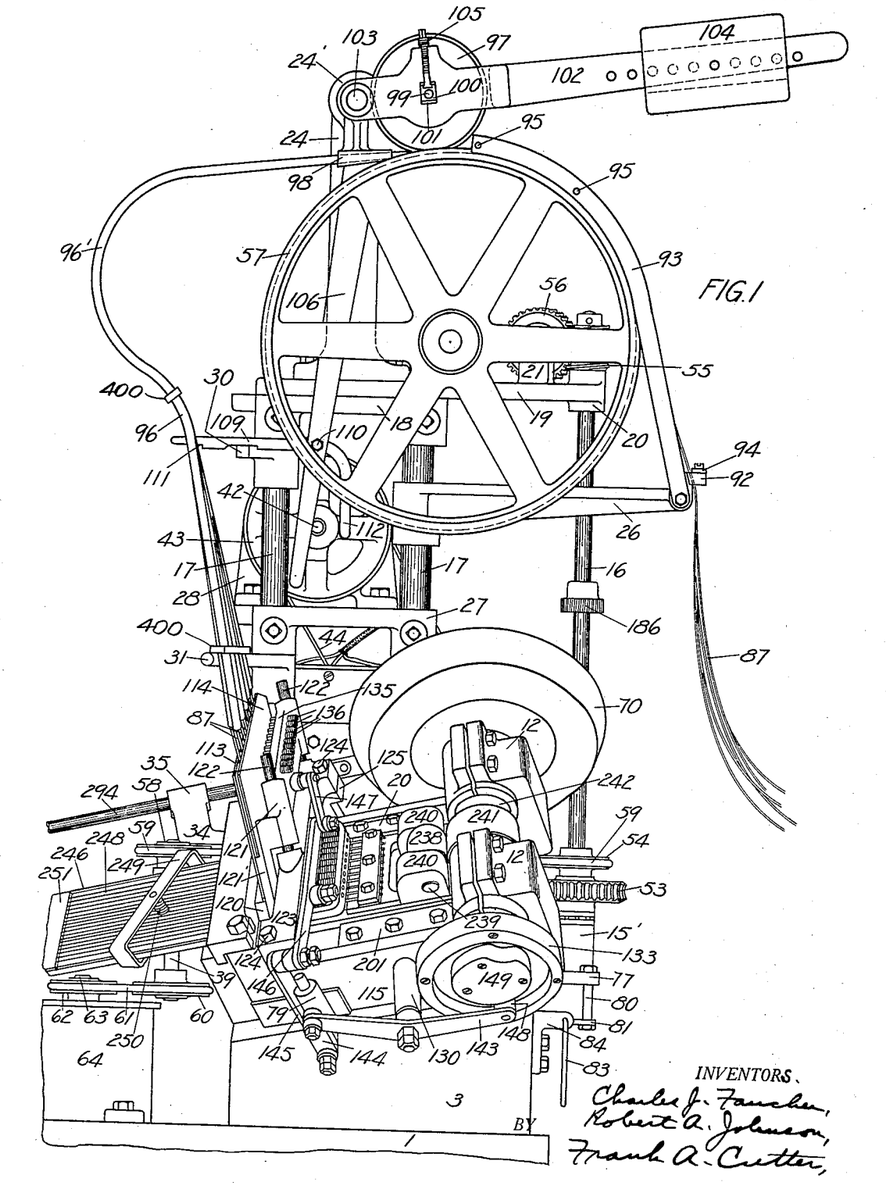
Figure 1 is a front side elevation of so much of a glazier's-point machine as is needed to embody and illustrate a practical form of our invention as aforesaid.
Figures 13, 14, 15, 16, 17:
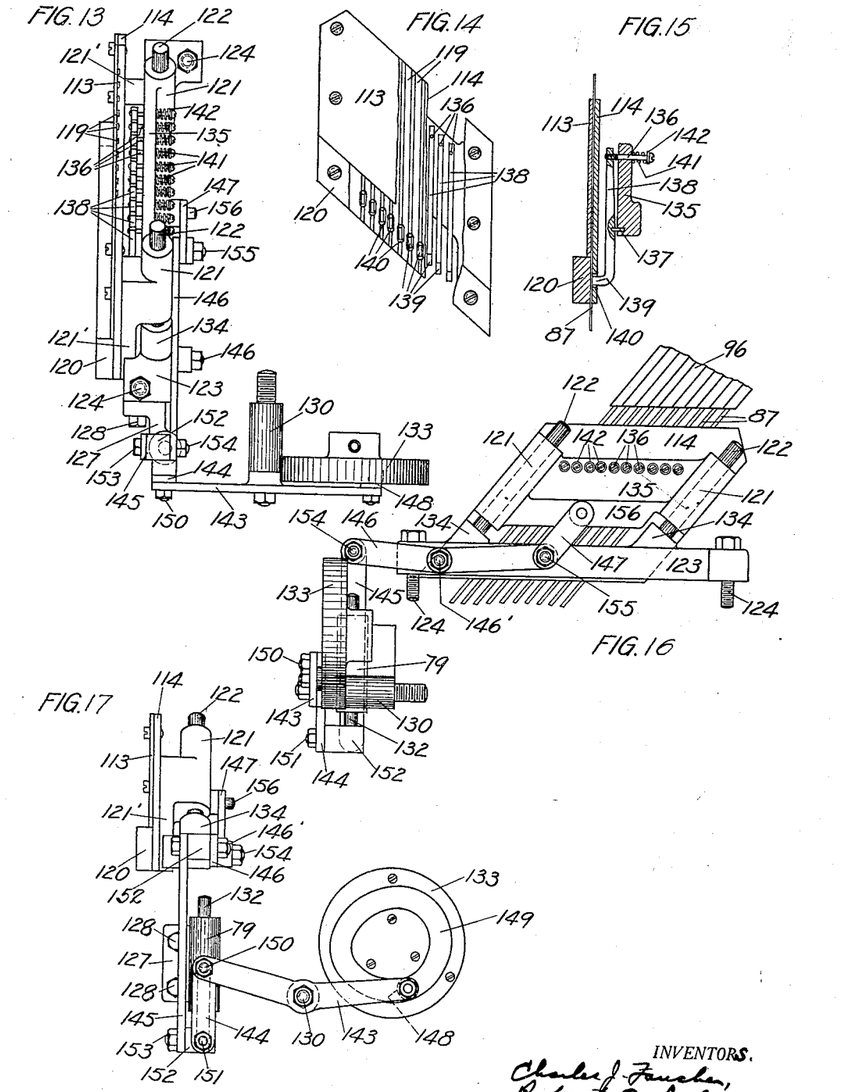
Fig. 13, a top plan of the zinc-strip feeding attachment.
Fig. 14, a rear elevation, broken away on different longitudinal, vertical planes, of parts of said attachment.
Fig. 15, a cross section through the parts and members appearing in Fig. 14.
Fig. 16, a front side elevation of said attachment.
Fig. 17, a front end elevation of said attachment.

A fixture 123 best shown in Figs. 1 and 16 is secured by means of bolts 124—124 respectively to a lug 125, on the back side of the bed 115, which is tapped at 126 to receive one of said bolts, and to the top of said bed adjacent to the front side thereof which has another tapped opening 126 therein to receive the other of said bolts when in place the fixture extends across the bed as is shown in Fig. 1. Another fixture 127 is secured by means of two bolts 128 to the front side of the bed 115, tapped openings 129, Fig. 3, being provided in said side to receive said bolts. A stud 130 is tapped into an opening 131 also in the front side of the bed 115.

The fixture 123 is crosswise of the bed 115, and therefore inclined at an angle of 40°. The fixture 127 has a sleeve 79 in which is adapted to slide up and down a rod 132 parallel with the front side of the bed 115, and the stud 130 extends forwardly and downwardly from said side. Mounted on and secured to the front end of the shaft 13 is a cam 133.

The fixture 123 has two lugs 134 on top, and the guide rods 122 have their bases firmly set in said lugs and extend vertically upward therefrom. A plate 135 extends between the sleeves 121 and forms with them a feeding head for and in front of the plates 114 and 113. The plate 135 has a row of openings therethrough from front to back and adjacent to the top thereof, to receive loosely therein ten horizontal tension pins 136, and has the same number of pivot pins 137 set in the back side thereof directly below said first-named pins. Each pin 135 is in the form of a screw, and has its rear terminal tapped into a presser finger 138. These ten fingers are mounted on the pivot pins 137, and have at the bottom ends rearwardly-extending parts 139 that enter slots 140 in the plate 114 to press against the strips 87 behind said parts. The fingers 138 depend from the pins 136, and the angular bases of said fingers are caused to press against the strips 87 in the grooves 119, because the slots 140 open into said grooves behind the base 120—see Fig. 15. A spring 141 is interposed between the head of each pin 136 and a washer 142 on said pin and the adjacent side of the plate 135, whereby the finger 138 with which said pin is engaged is yieldingly held with its lower terminal in a rearward position and its projection 139 pressed against the strip 87 behind said part. The amount of tension of any spring 141 can be varied by turning the associated pin 136 in or out of the finger 138 with which said pin is engaged.

It is now evident that the cross-head with its fingers 138 and the plates 113 and 114 constitute a feeding unit that can be moved up and down on the guide rods 122. Although the presser-fingers 138 at their lower ends constantly engage frictionally the strips 87, this engagement is of such a nature that the whole unit moves upwardly without difficulty, when said strips are held stationary, as they are intermittently by parts of the cutting mechanism yet to be described, and that said strips are carried downwardly with said unit when the same descends.

The required reciprocating movement is imparted to the aforesaid unit by means of the cam 133, a lever 143, links 144 and 145, a lever 146, and a link 147. The lever 143 is mounted to rock on the stud 130, and said lever at its front end is equipped with a roll 148 which is received in a cam-groove 149 in the front side of the cam 133. The upper end of the link 144 is pivotally connected at 150 with the rear end of the lever 143, and the lower end of said link is pivotally connected at 151 with a block 152. The lower end of the link 145 is pivotally connected at 153 with the block 152, and the upper end of said link is pivotally connected at 154 with the forward end of the lever 146. The lever 146 is mounted to rock on a stud 146' projecting from the front side of the fixture 123 near the front end thereof. The lower end of the link 147 is pivotally connected at 155 with the rear end of the lever 146, and the upper end of said link is pivotally connected at 156 with the plate or cross-head 135 in the center and near the bottom edge thereof, said link being in front of said plate.

As the cam 133 rotates, it oscillates the lever 143, through the medium of the roll 148, said lever causes the lever 146 to be oscillated through the medium of the links 144 and 145 and their pivotal connections, and said last-named lever, through the medium of the link 147, imparts a reciprocating movement to the cross-head and all the parts and members carried thereby. At each complete revolution of the cam 133, the presser fingers 138 move up with the plates 114 and 113 on the strips 87, and with said plates move down again carrying with them said strips. The cutting mechanism and the cam 133 are so relatively timed that the strips 87 are held securely while the fingers 138 ascend, and so prevent said fingers from carrying with them said strips, but are released when the fingers descend, so that the latter carry down with them the strips into position to have a row of points cut therefrom. The base 120 of the plate 114 descends onto the top of the knife 118.

If it be desired to remove the feeding attachment just described, as for the purpose of replacing the same with the other feeding attachment, the bolts 124 and 128 are taken out, the lever 143 is detached from the stud 130, the levers and links below the fixture 123 are disconnected, and said fixture and the parts and members supported thereon and thereby are removed from the bed 115. The bolts 128 are taken out and the fixture 127 is removed from the bed 115, and the stud 130 is unscrewed from said bed. The bed 115 is now cleared and ready to receive the steel-strip feeding attachment, which we will describe before proceeding to describe the cutter head or cutting mechanism, having special reference to Figs. 18 to 23, inclusive.

This mechanism has a fixture 157 which is adapted to have its rear end secured to the lug 125 on the bed 115 by the same bolt 124 that was used for the rear end of the fixture 123. Bolted to the front end of the fixture 157, at right-angles thereto, is a support 158 which is secured at the base by means of two bolts, one of which is shown at 159, against the front side of the bed 115, two openings 160 (Fig. 3) being tapped into said side to receive said bolts. The fixture 157 has uprights 161, 162, and 163, the first of said uprights being the longest and in front and the third of said uprights being the shortest and behind. The uprights 161 and 163 are T-shaped, and mounted thereon are two horizontal bearings 164 for a shaft 165 on which is mounted a feed roll 181 of peculiar construction.

The feed roll 181 consists of a hollow core 166 of leather or other yielding material, which is mounted directly on the shaft 165, between the bearings 164, and ten hard rings 167, one for each strip 87 and wide enough to accommodate itself to the same, mounted on said core. The shaft 165 has screw-threaded parts, between the ends of the feed roll 181 and the bearings 164, to receive nuts 168—168 by means of which the rings 167 are held in place, although permitted to rotate independently, on the core 166, and may be removed therefrom and replaced thereon, or have new rings substituted for the old ones.

In the feed roll 181 provision is made for a varying tension on the several strips passing in contact with said roll, whereby is obtained a uniform feed for the strips, which it might not be possible to obtain if a roll having a one-piece periphery, even though that were made of yielding material, were employed. The yielding core 166 between the shaft 165 and the plurality of rings 167 affords the proper amount of resiliency to obtain the desired results.

The upright 162 at the base is bolted to the front side of the fixture 157, and at the top has a cross-head 162' that extends rearwardly over the feed roll 181 and supports a vertical guide for the strips 87, said guide being located by said upright and cross-head directly above the bite between said feed roll and a tension roll 169. This guide consists of a front plate 170 having in the back side thereof ten vertical grooves 171 with their upper ends located directly below the lower ends of the tubes 96, when the attachment is in place in the machine, and a back plate 172 secured to said front plate over said grooves. The strips 87 are guided by means of the plates 170 and 172 to the bite between the tension roll 169 and the feed roll 181, from above. Secured to the fixture 157 and to the upright 162, directly below the plates 170 and 172, are vertical plates 173 and 174 which form a guide to receive the strips after they pass down between the aforesaid rolls. The plate 173 is grooved like the plate 170, and the guide made up of said first-named plate and the plate 174 is located to open at the bottom directly above the knife 118, with the front side of the plate 174, also of the plate 172, in the same vertical plane with the front side or edge of said knife.

Figures 21, 22:
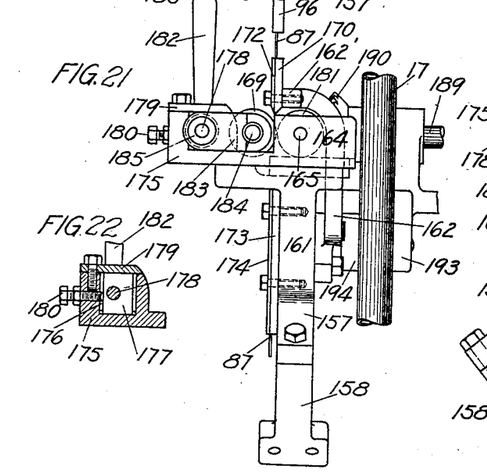
Fig. 21, a front end elevation of said last-named attachment.
Fig. 22, a sectional detail of the adjustable and tilting means for the tension roll associated with said feed roll, and, Fig. 23, a front side elevation of said last-named attachment.
Figure 23:
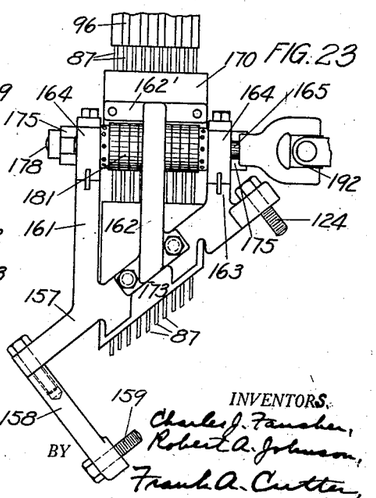

Each bearing 164 has a rearwardly extending part or arm 175 in which is a recess 176, Fig. 22, to receive a bearing block 177 for a horizontal rock-shaft 178, said recess being closed at the top by means of a plate 179 bolted to the arm below. A bolt 180 having a check nut thereon is tapped into and through the back side of each arm 175 to bear against the corresponding side of the block 177 in said arm. The rock-shaft 178 extends beyond the arms 175, and has mounted on and secured thereto in the center a handle 182, and at the ends two arms 183 in the forward terminals of which is journaled a shaft 184 which carries the tension roll 169. Collars 185 are pinned to the outer terminals of the rock-shaft 178, outside of the arms 183, to hold said rock-shaft against endwise movement.

Upon grasping the handle 182 and swinging the same to the left or rearwardly, the rock-shaft 178 is caused partially to rotate in the blocks 177 and carry with it upwardly the arms 183 and the shaft 184 with the roll 169 thereon, thus carrying said roll away from the feed roll 181. This opens the way for the operator to carry the strips 87 from the guide supported by the upright 162 down through into the guide comprising the plates 173 and 174. After the strips have been properly inserted in the guides, the roll 169 is moved down into position to grasp the strips between it and the feed roll in front, being thus moved into operative position by rocking forward the handle 182 and thereby swinging the arms 183 downwardly.

The amount of tension exerted by the roll 169 on the feed roll 181 is regulated by the bolts 180.

Figures 18, 19, 20:
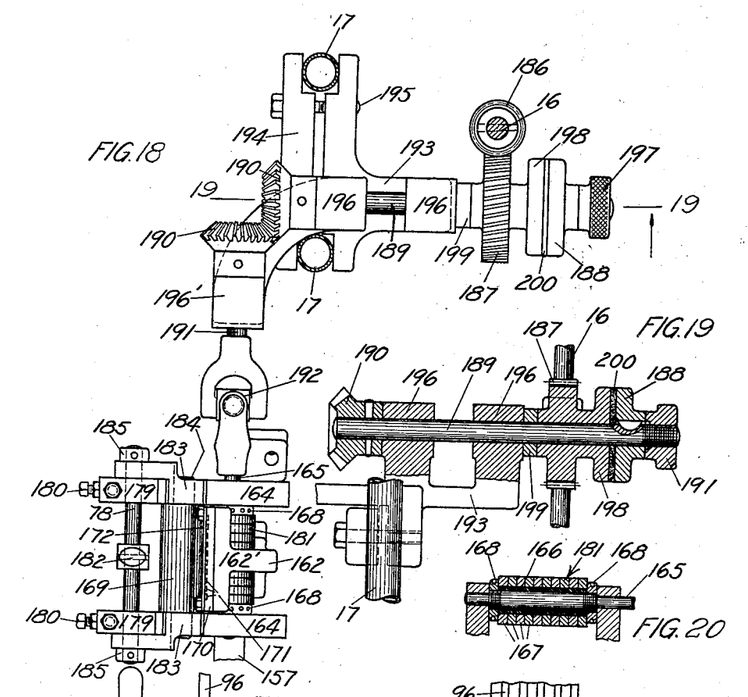
Fig. 18, a top plan of the steel-strip feeding attachment.
Fig. 19, a longitudinal, vertical section through parts of said last-named attachment, taken on lines 19—19, looking in the direction of the associated arrow, in Fig. 18.
Fig. 20, a longitudinal section through the feed roll of said last-named attachment.

A worm 186 is mounted on and secured to the vertical shaft 16, and this worm drives the feed-roll shaft 165 through the medium of a worm-wheel 187, a friction member 188, a shaft 189, a pair of bevel-gears 190, a shaft 191, and a universal-joint 192. A horizontal bracket 193 is secured to the inner and rear posts 17 by means of a clamp 194 and bolts, one of which latter appears at 195. The bracket 193 has on the top thereof a pair of bearings 196 for the shaft 189, also a bearing 196' for the shaft 191, which latter shaft is at right-angles to said first-named shaft. The friction member 188 is keyed to the shaft 189 adjacent to the rear terminal thereof, as shown in Fig. 19, being prevented from sliding off of the front end of said shaft by means of a nut 197 to receive which the outer terminal of the shaft is screw-threaded. The worm-wheel 187 is loosely mounted on the shaft 189 between the friction member 188 and the adjacent bearing 196, and the hub of said worm-wheel at the end adjacent to said friction member is provided with a friction member 198. A collar 199 is arranged on the shaft 189 between the hub of the worm-wheel 187 and the adjacent bearing 196, and there is a friction-disc 200 on said shaft between the friction members 198 and 188. The nut 197 not only holds the friction member 188 in place on the shaft 189, but, by being tightened or loosened, increases or decreases the amount of friction between both friction members and the friction-disc 200. The bevel-gear 190 on the shaft 189 is at the left of the left-hand or rear bearing 196, while the other bevel-gear is at the rear end of the shaft 191 back of the bearing 196'. The universal-joint 192 connects the shaft 191 with the shaft 165, it being necessary to employ a connection of this kind because of the angular relationship of the operating parts.

Rotary motion from the vertical shaft 16 is transmitted, through the worm 186, the worm-wheel 187 and its friction member 198, the friction-disc 200, the friction member 188, the shaft 189, the bevel-gears 190, the shaft 191, and the universal-joint 192, to the shaft 165. The feed roll 181 on the shaft 165 and the tension roll 169, when in motion, carry the strips 87 downwardly to the knives and at the proper rate of speed. A friction drive instead of a direct or positive drive is provided for the shaft 189, in order to enable the parts to slip and that the feed and tension rolls shall cease rotating at the times the strips being fed are clamped against downward movement to enable the points to be cut therefrom. In short, this friction drive enables the strips to be fed only as fast as they are cut, and thus prevents crowding or any other interference with the successful operation of the feeding and cutting mechanisms.

The steel-strip feeding attachment can be removed after taking out the bolts 124 and 159, and taking off the clamp 194.

Passing now to the cutting mechanism, and referring particularly to Figs. 2 to 9, inclusive, said mechanism is described as follows:

Arranged to slide longitudinally on the bed 115, and held in place by two gibs 201 bolted to said bed, is a carriage 202. The carriage 202 has a depending lug 203 in the center. Another carriage 204 is mounted on the carriage 202 and dove-tailed into the same for longitudinal movement. A horizontal rod 205 is arranged in the lug 203 and a cross piece 206 of the bed 115, with a spring 207 interposed between said cross piece and said lug, said rod being beneath the longitudinal center of the carriage 202. Threaded onto the inner end of the rod 205, in front of the lug 203, is a nut 208. The spring 207 forces the lug 203 against the nut 208, and exerts a constant forward pressure on said lug and the carriage 202. Slidingly arranged in the longitudinal center of the carriage 202 is a rod 209. This rod projects beyond the front end of the carriage 202, and is forced rearwardly by means of a spring 210 interposed in said carriage between the rear end of said rod and a plug 211 tapped into the rear end of the passage provided in said carriage for said rod, spring, and plug. There is a vertical opening 212 in the carriage 202, and a pin 213 extends downwardly from the carriage 204 into said opening, said pin being rigidly attached to the rod 209. The opening 212 is larger than the pin 213 to allow said pin to move back and forth therein, and the spring 210 tends constantly to force the rod 209, said pin, and the carriage 204 forwardly, that is, toward the front end of the machine. The top of the carriage 204 at the front end is elevated, and secured to this elevated portion by means of a plate 214 and bolts 215 are ten holding rods 216. These rods are arranged side by side and extend rearwardly over the top of the carriage 204 and through a block 217 secured to the carriage 202 back of said first-named carriage, and through a movable knife 218 let into and rigidly secured to said block behind. Bolted to the front end of a bed block 219 secured to the top of the bed 115, back of the block 217, is a gauge-bar 220 which receives the strips 87 as they descend and positions them for cutting. The rear, fixed knife 118 is mounted on the bed block 219, and secured thereon by means of an angular bar 221 bolted at 222—222 to the top of the bed 115. There are slots 223—223 opening rearwardly through end portions of the bar 221 to receive the bolts 222 and enable said bar to be adjusted forwardly and rearwardly. Bolts 224—224, tapped into and through the sides of the bed 115, bear against the ends of the knife 118, and two bolts 225, tapped into the part of the bar 221 that extends downwardly behind the knife 118, bear against the back side of said knife. Three additional bolts 226 are tapped downwardly through the part of the bar 221 that is above the knife 118, and bear on said knife from above. By means of the bolts 224, 225, and 226, the knife 118 is held securely in place and adjusted to locate the front side thereof in position to enable the strips 87 to be fed down against said side. The base 120 of the reciprocating plate 114, which is a part of the zinc-strip feed attachment, plays up and down in front of that part of the bar 221 that is on the knife 118, and the bottom portions of the plates 173 and 174, which are parts of the steel-strip feed attachment, are located behind said part of said bar, each of these feed elements being above said knife and in position to conduct the strips to be cut down in front of the knife. The aforesaid bolts are supplied with the usual check nuts. In the block 219, beneath the knife 118, are ten channels 227 to receive the points as they are cut from the strips, and wherein said points are held intermittently by the rods 216. Mounted on and bolted at 376 to the block 217 and extending to the left or rearwardly over a portion of the front, movable knife 218 is a guide bar 228, and having its ends rigidly secured to said bar is a U-shaped guide bar 229. Slidingly arranged in the bars 228 and 229 are ten clamping plungers 230, each provided intermediate of its ends with a collar 231. The passages in the bar 228 for the plungers 230 are enlarged at their front terminals to accommodate the collars 231. Interposed between the transverse part of the bar 229 and the collars 231 are springs 232. These springs have a constant tendency to force the collars 231 and the plungers 230 rearwardly. The knife 218 has ten projections 233 on the back side, which are in position, when said knife is actuated rearwardly (advanced), to make with the bottom rear edge of the knife 118 shearing cuts on the vertical strips 87, which cuts are at an angle of 40° with respect to the longitudinal side edges of the strips. The rods 216 are directly in front of the channels 227, and the plungers 230 are in front of the knife 118.

A transverse rock-shaft 234 is journaled in the bed 115 below and a little forward of the shaft 13, and mounted on and secured to said rock-shaft is a sleeve 235 provided with a short, upwardly extending arm 236, and with a long upwardly-extending arm 237. The arm 236 bears at its upper terminal against the front end of the rod 209. A roll 238 is mounted on a transverse shaft 239 journaled in two bearings 240 that rise from the carriage 202. Mounted on and secured to the shaft 13 between the bearings 12 are two cams 241 and 242, the former being larger than the latter. The cam 241 is in contact with the roll 238, which roll is in back of said cam, and the cam 242 is in contact with the arm 237 which is also in back of its cam. Two lock nuts 243 are provided on the shaft 13 for the cams 242 and 241.

At each revolution of the shaft 13, the cam 241, acting on the roll 238 and through the medium of the shaft 239 and the bearings 240, forces the carriage 202 rearwardly, or advances it, against the resiliency of the spring 207, and permits said carriage to be returned by said spring to the forward, retracted, or initial position, and at the same time the cam 242 acting on the arm 237 rocks said arm rearwardly on the rock-shaft 234 and with it the arm 236, and said last-named arm forces the rod 209 rearwardly, against the resiliency of the spring 210, with the result that the carriage 204 is moved rearwardly, or advanced, through the medium of the pin 213, and then said last-named spring acts to move said last-named carriage forwardly into initial or retracted position.

The cycle of operation of the cutting mechanism on the strips 67 will be best understood upon referring to Figs. 5, 6, 7, and 8. Starting with the parts as disposed in Fig. 5, it will be seen that the holding rod 216 is in contact with the last point cut from the strip 87, which point and those that have preceded it are located in the channel 227 behind said rod, and back of the vertical plane of the back side of said strip above, while the associated clamping plunger 230 is in inactive position. The passage through the knife 218 for the rod 216 is constricted at its forward terminal and the rod made correspondingly smaller, so that a stop is formed to limit the forward movement of said rod, as clearly shown at 244. The points as cut form in the channel 227 what may be termed a train 87'.

In this description of the operation of the cutting mechanism at each cycle of the machine, a single unit is being dealt with, but it is understood that actually in this machine ten units are simultaneously in operation.

Figures 5, 6, 7, 8, 12:
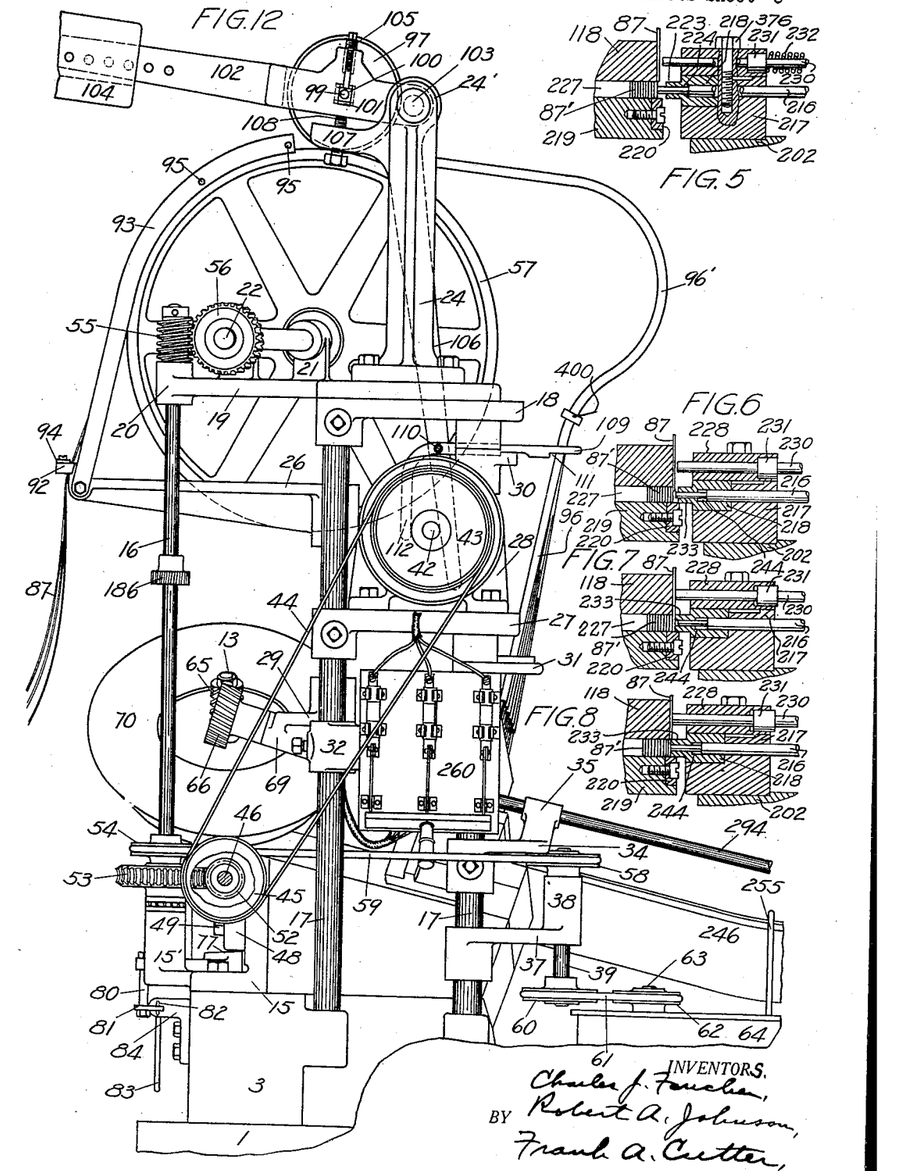

In Fig. 6, the rod 216 has been partially retracted, the knife 218 advanced, and the plunger 230 also has been advanced, the strip 87 having meanwhile descended far enough to prevent the last point cut from becoming displaced at the rear end of the channel 227.

The further advance movement of the parts causes the plunger 230 to contact forcibly with the strip 87, the carriage 204 being advanced far enough to carry the bar 228 farther away from the rear end of the collar 231 on said rod, and thus compress the spring 232 on the rod to a greater extent, with the result that said strip is held by the rear end of the rod firmly against the front side of the knife 118. At the same time the knife 218 is advanced against the lower-terminal portion of the strip 87, which strip by this time has moved down onto the gauge-block 220, and the shouldered part within the knife 218, which was close to the shouldered part of the rod 216, as represented at 244 in Fig. 5, has moved forward from said shouldered part of the rod, as shown in Fig. 7. This shouldered part of the knife 218 has already commenced to move away from the shouldered part of the rod 216, in the condition illustrated in Fig. 6, but not so far as in Fig. 7.

Finally, as in Fig. 8, while the plunger 230 is still in clamping position relative to the strip 87, the cutting portion 233 of the knife 218 makes a shearing cut with the adjacent edge of the knife 118, and produces another point and adds the same to the train 87' in the channel 227, said cutting part advancing far enough to carry the newly cut point into said channel with the front side of said point in approximately the same plane with the back side of the strip 87. By this time the advancing carriage 204 carries rearwardly the rod 216 which stops finally with its front end against the point last cut, in which position said rod remains while the knife 218 is retracted and with it the plunger 230, until the parts assume the positions which they occupy in Fig. 5.

In these operations the knife 218 is advanced and retracted by and with the carriage 202, as are also the plungers 230, the latter, however, being additionally subject to the action of their springs 232 and therefore having independent movements of their own, while the rods 216 are advanced and retracted by and with the slide 204.

The knives 218 are operated at the rate of five hundred strokes per minute, and cut ten points at each stroke, with the result that five thousand points are produced per minute.

The manner in which the bar 228 is fastened by the bolts 376 to the block 217 is clearly shown in Fig. 5.

As the points are cut from the strips 87 they are forced into the channels 227, and from said channels into channels 245 in a carrier 246. This carrier at its forward end is attached to the left-hand or rear end of the bed 115, hence at the place of attachment must be disposed transversely at an angle of 40°, and from said place said carrier inclines downwardly. There are ten longitudinal channels 245 in the carrier, which channels open through opposite ends thereof, and over a section of the carrier which is adjacent to the cutter head is a glass plate 248 which enables the operator to observe the progress of the trains of points traveling in the carrier channels. The glass plate 248 is held in place on the carrier by means of a clamp 249 having fingers to engage the under side of the carrier, and a spring 250 to bear on said plate. The carrier 246 is provided beyond the plate 248 with a metallic plate 251.

The tank 64 contains a hot adhesive liquid, usually wax, which is pumped into the carrier 246 to coat the points and thereby cause them to adhere to each other.

The operation of the machine as a whole is described as follows:

Before starting the machine, it is necessary to carry the ten strips 87 up through the slots in the guide 92 behind the bar 94 and between the guide bars 93, beneath the rods 95 onto the wheel 57, the lever 106 with its latch 109 first having been manipulated to raise the roll 97 from said wheel and maintain said roll in elevated position. The strips 87 are carried over the wheel 57, inserted in the holder 98, and pushed along into the tubes 96 through the curved portions 96' thereof and down through the bottom ends of said tubes, and finally are pushed downwardly between the plates 114 and 115 of the zinc-strip feeding attachment, provided the strips be of zinc, onto the top of the gauge-block 220, or moved down between the plates 170 and 172, between the feed roll 181 and the tension roll 169, and between the plates 173 and 174 onto said gauge-block, if said strips be of steel and the steel-strip feeding attachment be employed. Then the switch 33 is thrown to set the motor 28 in motion, and, if necessary, the rod 82 is forced rearwardly to elevate the friction cone 51 into engagement with the friction cone 70. The driving and driven parts of the machine are now in motion.

At each revolution of the cams 241 and 242, on the shaft 13, the gangs of cutters 218, clamping plungers 230, and holding the rods 216 are operated to cut ten points from the bottoms of the strips 87, and the trains of points 87' are advanced a distance equal to the thickness of one point in their channels. The strips 87 are fed constantly, although having their lower ends momentarily retarded by the gauge-bar 220 and the clamping plungers 230 while the cut is being made each time, in the event the zinc-strip feeding attachment be in use. If the strips be fed with the assistance of the steel-strip feeding attachment, the slack in said strips produced while the strips are being held by the clamping plunger 230, accumulates, so to speak, in the curved portions 96' of the tubes 96, and this slack in the spring steel automatically assists in the feeding operation, as soon as the strips are released by the plungers 230.

When the zinc-strip feeding attachment is used, the feeding head, which reciprocates on the rods 122 and carries and includes the fingers 138, carries down the plates 113 and 114 and with them the strips 87 a distance equal to the width of a point 87'' between any two of its parallel sides, while the plungers 230 are out of contact with said strips, and said head rises the same distance and carries with it said plates while said plungers are in clamping relationship with said strips, said plates and the finger ends 139 then sliding upwardly on the stationary strips without affecting them.

In the case of the steel-strip feeding mechanism, the rolls 181 and 169 remain stationary, a slip taking place at the friction disc 200, while the strips 87 are in the grasp of the plungers 230.

The ten points are cut from the ten strips 87 at an angle of 40° by the knives 118 and 218. These points are pushed into the channels 227 by the cutting parts 233 of the knife 218, and held there by the rods 216, while said knife is retracted, and until said strips are carried down in front of said points. The points as cut force those behind farther and farther along in the channels 227 and into the channels 245.

What we claim as our invention, and desire to secure by Letters Patent, is—

1. The combination, in a glazier's-point machine, with transversely-inclined reciprocating strip-cutting mechanism in a fixed plane, of a vertically grooved guide plate for the strips, and means to support said plate adjacent to the cutting parts of said mechanism, the bottom edge of said plate being inclined to correspond with the inclination of said mechanism.

2. The combination, in a glazier's-point machine, with a transversely inclined bed and reciprocating strip-cutting mechanism thereon, of a fixture attachable to said bed crosswise thereof, and detachable therefrom, and guide plates supported from said fixture for said strips.

3. The combination, in a glazier's-point machine, with a transversely-inclined bed and cutting mechanism for strips, of a fixture attachable to said bed crosswise, and guide plates, in certain of which are vertical grooves for said strips, said plates being supported from said fixture, and the bottom edges of said plates being inclined to correspond with the inclination of said bed and cutting mechanism.

4. In a glazier's-point machine, a bed, a reciprocating carriage mounted on said bed, positive means to actuate said carriage in one direction, and yielding means to actuate said carriage in the other direction, a member, channeled to receive the points when cut, mounted on said bed, a fixed knife mounted on said member above and parallel with said channel, with the cutting edge of said knife adjacent to the entrance thereto, and a knife carried by said carriage in front of said entrance.

5. In a glazier's-point machine, a bed, a member mounted on said bed and having a channel therein to receive the points when cut, and provided with a gauge-block for the strip to be cut, said gauge-block being located in line with the bottom of said channel and projecting beyond the front end thereof, a fixed knife mounted on said member above and adjacent to and parallel with said channel, with the cutting edge of said knife adjacent to the entrance thereto, a reciprocating carriage, and a knife carried by said carriage in line with said channel and in front of said entrance.

6. In a glazier's-point machine, a bed, a member, channeled to receive the points when cut, mounted on said bed, a fixed blade mounted on said member above and parallel with said channel, with the cutting edge of said knife adjacent to the entrance thereto, a bar spanning said channeled member, adjustably secured at the ends to said bed, and provided with means to adjust and hold said knife in place, a reciprocating carriage, and a knife carried by said carriage in line with said channel and in front of said entrance.

7. In a glazier's-point machine, a bed, a point-receiving member, a fixed knife mounted above said member, a reciprocating carriage mounted on said bed, a reciprocating carriage mounted on the first, a knife carried by said first carriage to cooperate with said fixed knife, and means carried by said second carriage to hold the points in the member, while said points are not otherwise held.

8. In a glazier's-point machine, a bed, a member to receive the points as cut from a strip, a fixed knife, a reciprocating carriage mounted on said bed, a second reciprocating carriage mounted on the first, a knife carried by said first carriage to cooperate with said fixed knife, a rod carried by said second carriage and adapted to hold the points in place in said member, when said points are not otherwise held, and a plunger supported by said first-named carriage in position to clamp the strip against said fixed knife at the time said movable knife is making its cut.

9. In a glazier's-point machine, strip-feeding means, a reciprocating carriage carrying means to cut points from strips fed by said feeding means, and a second reciprocating carriage mounted on the first, and carrying a holding rod for said points as cut.

10. In a glazier's-point machine, strip-feeding means, a reciprocating carriage, a knife carried by said carriage for cutting points from strips fed by said feeding means, a plunger also carried by said carriage and adapted to clamp said strips while being cut, and a reciprocating carriage mounted on the first, and provided with a holding rod for the points as cut.

11. In a glazier's-point machine, a carriage spring pressed in one direction, a positive means to actuate said carriage in the opposite direction, a knife carried by said carriage, a carriage mounted on the first and spring pressed in one direction, positive means to actuate said second-named carriage, in the opposite direction, and a holding rod carried by said second-named carriage.

12. In a glazier's-point machine, a carriage spring pressed in one direction, positive means to actuate said carriage in the opposite direction, a knife carried by said carriage, a clamping plunger also carried by said carriage, a carriage mounted on the first and spring-pressed in one direction, positive means to actuate said second-named carriage in the opposite direction, and a holding rod carried by said second-named carriage.

13. In a glazier's-point machine, a bed, a channeled member mounted on said bed, a fixed knife mounted on said member over the channel therein, a carriage mounted on said bed, a second carriage mounted on the first, positive means to actuate said carriages independently in one direction, and yielding means to actuate said carriages independently in the opposite direction, a bored knife carried by said first carriage, and having a cutting part in line with said channel, a rod carried by said second carriage, and extending into and through the bore in said movable knife to hold the points, while not otherwise held, in said channel.

14. In a glazier's-point machine, a bed, a channeled member mounted on said bed, a fixed knife mounted on said member over the channel therein, a carriage mounted on said bed, a second carriage mounted on the first, positive means to actuate said carriages independently in one direction, and yielding means to actuate said carriages independently in the opposite direction, a bored knife carried by said first carriage and having a cutting part in line with said channel, a rod carried by said second carriage and extending into and through the bore in the movable knife to hold the points, while not otherwise held, in said channel, a perforated member supported by said first carriage above said movable knife, and a spring-pressed plunger in said last-named member in position to clamp the strip against said fixed knife at the time said movable knife is making its cut.

15. In a glazier's-point machine, a bed, a channeled member mounted on said bed, a fixed knife mounted on said member over the channel therein, a carriage mounted on said bed, a second carriage mounted on the first, positive means to actuate said carriages independently in one direction, and yielding means to actuate said carriages independently in the opposite direction, a bored knife carried by said first carriage and having a cutting part in line with said channel, a rod carried by said second slide and extending into and through the bore in the movable knife to hold the points in said channel, after each is cut and while said points are not otherwise held, a perforated member carried by said first carriage above said movable knife, and provided with a perforated yoke, and a clamping plunger arranged in the perforations in said last-named member and yoke, having an enlargement, and a spring interposed between said enlargement and the perforated part of said yoke, and being adapted to force a strip against said fixed knife at the time the cut is being made.

16. In a glazier's-point machine, a bed having bearings, a shaft journaled in said bearings, cams mounted on said shaft, a carriage mounted on said bed and spring-pressed in one direction, said carriage having bearings, a shaft journaled in said carriage bearings, a roll mounted on said shaft in contact with one of said cams, a second carriage mounted on the first, a spring-pressed rod in said first carriage, connecting means between said rod and said second carriage, a rock-shaft journaled in said bed and having arms respectively in engagement with the other of said cams and with said rod, a channeled member mounted on said bed, a fixed knife mounted on said member over the channel therein, a knife carried by said first carriage, and having a part in line with said channel, said last-named knife having a passage therethrough, a holding rod carried by said second carriage and extending into and through said passage, a perforated member carried by said first carriage above said movable knife, and a spring-pressed clamping plunger operating in and through the perforations in said last-named member, and being in position to force a strip against said fixed knife during the cutting operation.

17. In a glazier's point machine, mechanism to cut points from a strip including a fixed and a movable knife, means for feeding a strip between said knives, an independently movable holding rod to retain points in place after being cut and while the movable knife is being retracted and the strip started downwardly.

18. In a glazier's point machine, mechanism to cut points from a strip including a fixed and a movable knife, means for feeding a strip between said knives, a clamping member to hold said strip while being cut, an independently movable holding rod to retain points in place after being cut and while the movable knife is being retracted and the strip started downwardly.

CHARLES J. FANCHER.
ROBERT A. JOHNSON.